(12) United States Patent
Fan et al.

(10) Patent No.: US 12,182,633 B2
(45) Date of Patent: Dec. 31, 2024

(54) METHOD, SYSTEM, COMPUTER READABLE MEDIUM, AND DEVICE FOR SCHEDULING COMPUTATIONAL OPERATION BASED ON GRAPH DATA

(71) Applicant: ZHEJIANG TMALL TECHNOLOGY CO., LTD., Hangzhou (CN)

(72) Inventors: Wenfei Fan, Beijing (CN); Wenyuan Yu, Beijing (CN); Jingbo Xu, Beijing (CN); Xiaojian Luo, Beijing (CN)

(73) Assignee: ZHEJIANG TMALL TECHNOLOGY CO., LTD., Hanzhou (CN)

( * ) Notice: Subject to any disclaimer, the term of this patent is extended or adjusted under 35 U.S.C. 154(b) by 587 days.

(21) Appl. No.: 17/160,212

(22) Filed: Jan. 27, 2021

(65) Prior Publication Data
US 2021/0149746 A1    May 20, 2021

Related U.S. Application Data

(63) Continuation of application No. PCT/CN2018/097517, filed on Jul. 27, 2018.

(51) Int. Cl.
*G06F 9/50* (2006.01)
*G06F 9/48* (2006.01)
*G06F 16/901* (2019.01)

(52) U.S. Cl.
CPC .......... *G06F 9/5088* (2013.01); *G06F 9/4856* (2013.01); *G06F 9/4881* (2013.01); *G06F 9/5027* (2013.01); *G06F 9/5061* (2013.01)

(58) Field of Classification Search
CPC .. G06F 16/9024; G06F 9/4881; G06F 9/4856; G06F 9/5027; G06F 9/5088; G06F 9/5061

(Continued)

(56) References Cited

U.S. PATENT DOCUMENTS

| 6,990,665 B2 | 1/2006 | Ballantyne |
| 8,156,495 B2 | 4/2012 | Chew et al. |

(Continued)

FOREIGN PATENT DOCUMENTS

| CN | 104850461 A | 8/2015 |
| CN | 106445686 A | 2/2017 |
| CN | 107122244 A | 9/2017 |

OTHER PUBLICATIONS

Translation of International Search Report mailed May 5, 2019, from corresponding PCT Application No. PCT/CN2018/097517, 2 pages.

(Continued)

*Primary Examiner* — Chun Kuan Lee
(74) *Attorney, Agent, or Firm* — Lee & Hayes, P.C.

(57) ABSTRACT

A method for scheduling a computational operation based on graph data, which includes: dividing graph data into multiple partitions; scheduling the partitions to be allocated to multiple processors; successively assigning the partitions to corresponding threads of the processors for computation according to a respective degree of criticality of each partition; determining whether an idle processor exists, a processor being the idle processor when the processor includes one or more idle threads; communicating the idle processor with other processor(s) to find partition(s) to be computed and corresponding to the other processor(s); selecting and determining a partition to be computed; and migrating and binding the determined partition to be computed to thread(s) of the idle processor for processing. The present disclosure further relates to a system, a computer readable medium, and a device for scheduling a computational operation based on graph data.

20 Claims, 4 Drawing Sheets

(58) Field of Classification Search
USPC .......................................................... 712/220
See application file for complete search history.

(56) References Cited

U.S. PATENT DOCUMENTS

| | | |
|---|---|---|
| 8,495,651 B2 | 7/2013 | Kanai et al. |
| 8,595,733 B2 | 11/2013 | Dodge et al. |
| 8,875,143 B2 | 10/2014 | Piazza et al. |
| 9,128,763 B2 | 9/2015 | Sarkar et al. |
| 9,183,058 B2 | 11/2015 | Li et al. |
| 9,424,093 B2 | 8/2016 | Dodge et al. |
| 9,684,944 B2 | 6/2017 | Taylor et al. |
| 2003/0204552 A1* | 10/2003 | Zuberi .................... H04L 69/12 |
| | | 718/103 |
| 2004/0019891 A1 | 1/2004 | Koenen |
| 2006/0020701 A1* | 1/2006 | Parekh .................. G06F 9/4856 |
| | | 709/226 |
| 2006/0029056 A1* | 2/2006 | Perera ................. H04L 49/3009 |
| | | 370/386 |
| 2006/0206881 A1 | 9/2006 | Dodge et al. |
| 2009/0089552 A1 | 4/2009 | Inchingolo et al. |
| 2011/0050713 A1* | 3/2011 | McCrary ............... G06F 9/3877 |
| | | 345/530 |
| 2012/0222043 A1 | 8/2012 | Gounares et al. |
| 2013/0247068 A1 | 9/2013 | Min |
| 2014/0320497 A1* | 10/2014 | Vojnovic ............... G06T 11/206 |
| | | 345/440 |
| 2016/0275025 A1* | 9/2016 | Accapadi .............. G06F 9/4881 |
| 2017/0083382 A1* | 3/2017 | LeBeane ................ G06F 1/3293 |
| 2019/0005407 A1* | 1/2019 | Harris .................... G06N 3/088 |

OTHER PUBLICATIONS

Translation of Written Opinion mailed May 5, 2019, from corresponding PCT Application No. PCT/CN2018/097517, 4 pages.
English Translation of Chinese Office Action for corresponding Chinese application No. CN 201880094017 dated Apr. 10, 2024, 5 pages.
English Translation of Chinese Search Report for corresponding Chinese application No. CN 201880094017 dated Jul. 15, 2023, 1 page.
English Translation of Chinese Search Report for corresponding Chinese application No. CN 201880094017 dated Apr. 10, 2024, 1 page.

* cited by examiner

METHOD, SYSTEM, COMPUTER READABLE MEDIUM, AND DEVICE FOR SCHEDULING COMPUTATIONAL OPERATION BASED ON GRAPH DATA

CROSS REFERENCE TO RELATED PATENT APPLICATIONS

This application claims priority to and is a continuation of PCT Patent Application No. PCT/CN2018/097517 filed on 27 Jul. 2018, and entitled "Method, System, Computer Readable Medium, and Device for Scheduling Computational Operation Based on Graph Data," which is hereby incorporated by reference in its entirety.

TECHNICAL FIELD

The present disclosure relates to the technical field of data resource distribution, and particularly to methods, systems, computer readable media, and devices for scheduling computational operation based on graph data.

BACKGROUND

With the development of information technology and the popularization of the Internet, the amount of data has explosively increased. In particular, the rapid development of social networks in recent years has led to a sharp increase in graph data. Graph data is a type of data stored using graphs as a data structure, which is abstracted into nodes and connections between nodes. In the real world, graph data is widespread and large in volume, such as interpersonal relationship graphs in microblogging, webpage pointing graphs in search engines, geographical information graphs in transportation systems, etc. Analyzing and mining information in graph data is of great significance to work in the fields such as business management, production control, market analysis, engineering design, and scientific exploration, etc.

When running graph data, multiple user threads waiting to be executed on a processor or CPU of a computer system may exist at any given processing time. In existing technologies, after a thread has computed a task, the thread randomly executes a next task without evaluating a degree of criticality of the task. Furthermore, no communication is conducted between different processors or CPUs. For example, tasks under CPU1 threads have all been executed, CPU2 threads are all in a running state, and still have pending tasks waiting to be executed. In this case, a problem of a relatively long execution time of CPU2 and a relatively long waiting time of CPU1 occurs, thereby wasting computing resources.

Accordingly, there is an urgent need to design a method for scheduling a computational operation based on graph data in order to overcome the shortcomings of existing graph data operations.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a method, a system, a computer readable medium, and a device for scheduling a computational operation based on graph data to solve the technical problem of wasting computing resources when running graph data.

The embodiments of the present disclosure provide a method for scheduling a computational operation based on graph data, which includes the following steps:

dividing graph data into multiple partitions;
scheduling the partitions to be allocated to multiple processors;
successively assigning the partitions to corresponding threads of the processors for computation according to a respective degree of criticality of each partition;
determining whether an idle processor exists, a processor being the idle processor when the processor includes one or more idle threads;
communicating the idle processor with other processor(s) to find partition(s) to be computed and corresponding to the other processor(s);
selecting and determining a partition to be computed; and
migrating and binding the determined partition to be computed to thread(s) of the idle processor for processing.

Furthermore, the number of partitions allocated to each processor is greater than the number of threads corresponding to each processor.

Furthermore, if multiple partitions to be computed exist, a method of selecting and determining the partition to be computed includes:

considering an execution time of each partition to be computed and migration overheads associated with the partitions to be computed, and evaluating losses and profits;
determining which specific partition to be computed is allocated to the idle processor according to an evaluation result; and
determining a mode for migrating data of the partition to be computed to the idle processor.

At the same time, the embodiments of the present disclosure also provide a system for scheduling a computational operation based on graph data, including:

a division module configured to divide graph data into multiple partitions;
an allocation module configured to schedule the partitions to be allocated to multiple processors;
a submission module configured to successively assign the partitions to corresponding threads of the processors for computation according to a respective degree of criticality of each partition;
a determination module configured to determine whether an idle processor exists, a processor being the idle processor when the processor includes one or more idle threads;
a communication module configured to cause the idle processor to communicate with other processor(s) to find partition(s) to be computed and corresponding to the other processor(s);
a selection module configured to select and determine a partition to be computed; and
a migration module configured to migrate and bind the determined partition to be computed to thread(s) of the idle processor for processing.

Furthermore, the number of partitions allocated to each processor by the allocation module is greater than the number of threads corresponding to each processor.

Furthermore, if multiple partitions to be computed exist, selecting and determining the partition to be computed by the selection module specifically includes:

considering an execution time of each partition to be computed and migration overheads associated with the partitions to be computed, and evaluating losses and profits;

determining which specific partition to be computed is allocated to the idle processor according to an evaluation result; and determining a mode for migrating data of the partition to be computed to the idle processor.

In addition, the embodiments of the present disclosure also provide a computer readable medium storing a computer program for running graph data. The computer program includes instructions to cause a computer system to perform the following operations:

dividing graph data into multiple partitions;

scheduling the partitions to be allocated to multiple processors;

successively assigning the partitions to corresponding threads of the processors for computation according to a respective degree of criticality of each partition;

determining whether an idle processor exists, a processor being the idle processor when the processor includes one or more idle threads;

communicating the idle processor with other processor(s) to find partition(s) to be computed and corresponding to the other processor(s);

selecting and determining a partition to be computed; and migrating and binding the determined partition to be computed to thread(s) of the idle processor for processing.

Furthermore, the number of partitions allocated to each processor is greater than the number of threads corresponding to each processor.

Furthermore, if multiple partitions to be computed exist, a method of selecting and determining the partition to be computed includes:

considering an execution time of each partition to be computed and migration overheads associated with the partitions to be computed, and evaluating losses and profits;

determining which specific partition to be computed is allocated to the idle processor according to an evaluation result; and determining a mode for migrating data of the partition to be computed to the idle processor.

In addition, the embodiments of the present disclosure also provides an electronic device, which includes a processor and a memory, the memory being configured to store a computer program, and the processor being configured to execute the computer program stored in the memory, so that the electronic device executes any of the foregoing methods for scheduling a computational operation based on graph data.

Compared with the existing technologies, the above solutions of the embodiments of the present disclosure have at least the following beneficial effects:

First, conducting communications between processors can reduce a waiting time of each processor.

Second, evaluating the degree of criticality of a partition before a thread executes computations on the partition can reduce an execution time of a certain processor and avoid a relatively long execution time.

Third, evaluating and selecting multiple partitions to be computed can accelerate convergence, and ensure correctness and termination of data computation operations.

BRIEF DESCRIPTION OF THE DRAWINGS

In order to more clearly describe technical solutions in the embodiments of the present disclosure, accompanying drawings that are needed for describing the embodiments are briefly described hereinafter. Apparently, the drawings in the following description represent only some embodiments of the present disclosure. For one of ordinary skill in the art, other drawings can be obtained from these drawings without making any creative effort.

DETAILED DESCRIPTION

In order to make the objectives, technical solutions and advantages of the present disclosure clearer, the present disclosure will be further described in detail hereinafter in conjunction with the accompanying drawings. Apparently, the described embodiments represent only a part and not all of the embodiments of the present disclosure. Based on the embodiments of the present disclosure, all other embodiments obtained by one of ordinary skill in the art without making any creative effort shall fall within the scope of protection of the present disclosure.

Exemplary embodiments of the present disclosure are described in detail hereinafter with reference to the accompanying drawings.

Figure 1:
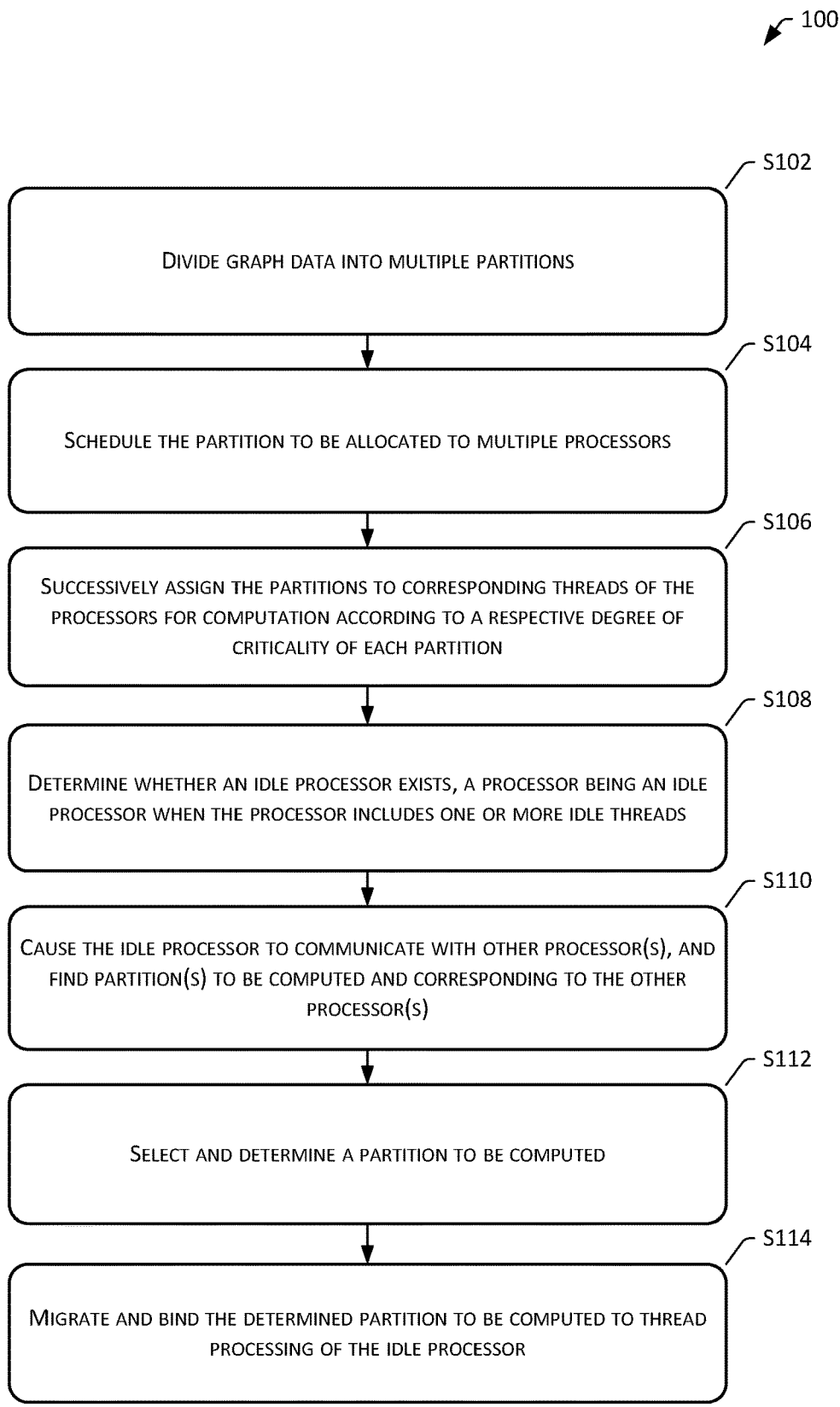
FIG. 1 is a flowchart of a method for scheduling a computational operation based on graph data according to the embodiment of the present disclosure.

The embodiments of the present disclosure provide a method 100 for scheduling a computational operation based on graph data, as shown in FIG. 1, which includes the following steps:

S102: Divide graph data into multiple partitions.

Methods of partitioning the graph data are not limited, as long as the number of partitions is greater than the number of threads, so that a scenario of scheduling partitions by threads can be realized. A large number of the partitions can reduce a size of each partition, thereby avoiding a situation where amounts of computations of some partitions are much larger than those of other partitions. In implementations, partitioning can be implemented by a partitioning algorithm, for example, METIS. The partitioning algorithm can follow principles such as ensuring the least number of cross-partition edges and the least number of cross-partition points, etc.

In the present embodiment, in combination with a NUMA (non-uniform memory access architecture) processing system, graph data is divided into three levels. Specifically, the processing system includes at least one computing device, each computing device corresponding to multiple memories, and each memory corresponding to multiple processors. A specific method for three-level partitioning includes:

partitioning graph data according to the number of the computing devices and a communication overhead between the computing devices to obtain multiple first-level partitions;

dividing each first-level partition into multiple second-level partitions according to the number of NUMA nodes in each computing device and a communication overhead between the NUMA nodes; and dividing each second-level partition into multiple third-level partitions according to the number of working nodes in each NUMA node and a communication overhead between each working node, wherein a working node includes a processor or a processor thread.

Data in each third-level partition that is formed is data having a higher degree of correlation. Data in two adjacent third-level partitions has shared edge data. Once a partition updates edge data, a neighboring partition needs to be notified through a message to perform an update.

The graph data uses graphs to store data, which is one of the closest to high-performance data structure methods for storing data. A graph includes a plurality of nodes and relationships. Relationships between nodes are a very important part of a graph database. A number of related data can be found through the relationships, such as node collections, relationship collections, and attribute collections thereof.

S104: Schedule the partition to be allocated to multiple processors.

After partitioning is completed in step S1, each processor may be dispatched and allocated with different numbers of partitions because data sizes of each partition are different. Each processor may correspond to multiple threads, and the number of partitions allocated to each processor may be greater than the number of threads corresponding to each processor. The scheduling can be performed by using an existing scheduling algorithm. In the present embodiment, a scheduler controls the processors to call different partitions.

S106: Successively assign the partitions to corresponding threads of the processors for computation according to a respective degree of criticality of each partition.

Each thread retrieves partition data from an associated processor to perform computations, and after an execution is completed, can continue to retrieve a next partition from the processor for execution. At this time, it is necessary to evaluate a degree of criticality of each partition, determine a key partition and call for execution, to allow the thread to compute the key partition first, which can reduce an execution time of the partition.

The key partition is evaluated based on data runtime parameters and statistical information thereof. For example, a first partition and a second partition are both associated with data of a third partition. At this time, a determination can be made that the third partition is a key partition, and a thread may perform computations for the third partition first.

S108: Determine whether an idle processor exists, a processor being an idle processor when the processor includes one or more idle threads.

S110: Cause the idle processor to communicate with other processor(s), and find partition(s) to be computed and corresponding to the other processor(s).

The other processor(s) refer(s) to processor(s) other than the idle processor. Threads of the other processor(s) may all be in a running state, or idle threads may exist.

In response to determining that an idle processor exists, the idle processor may send a message indicating that an idle thread exists to any other processor. When another processor receives the message, if the other processor has a partition to be computed, the other processor may allocate the partition to be computed to the idle processor for computation. The partition to be computed refers to a partition that has not been executed by a thread yet.

S112: Select and determine a partition to be computed.

Figure 2:
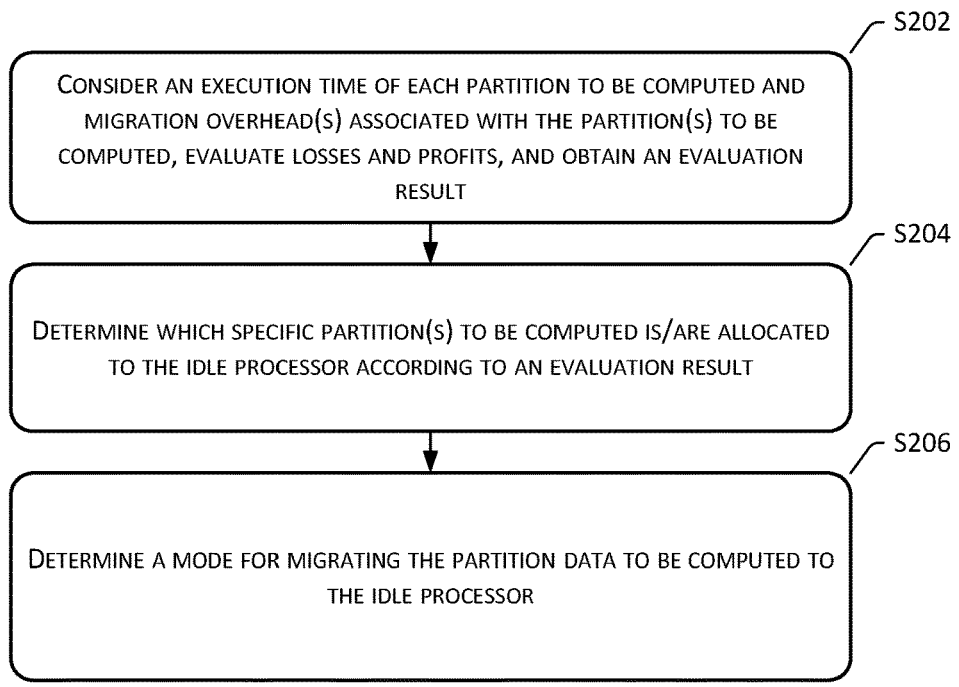
FIG. 2 is a flowchart of a method for selecting a partition to be computed in a method for scheduling a computational operation based on graph data according to the embodiment of the present disclosure.

When the number of partitions to be computed is multiple, it is necessary to specifically evaluate how many partitions need to be allocated and which partition(s) is/are migrated to the idle processor. As shown in FIG. 2, an evaluation method 200 for selecting and determining the partition to be computed may include the following steps:

S202: Consider an execution time of each partition to be computed and migration overhead(s) associated with the partition(s) to be computed, evaluate losses and profits, and obtain an evaluation result.

Data sizes of partitions to be computed are different, and the times required to perform computations are also different. At this time, execution times of partitions under a processor need to be considered as a whole to prevent partitions with a long execution time from being allocated to a same processor. In addition to considering the execution times of the partitions, it is also necessary to consider migration overheads associated with the partitions to be computed. A migration overhead includes a migration overhead formed by time overheads of two parts: transferring data of a partition to be computed from one machine to another (a communication overhead) and rebuilding the partition to be computed on a destination machine.

The evaluation result includes loss and profit data of each partition to be computed. In an evaluation process, an evaluation algorithm can be used for computation, such as a greedy algorithm.

S204: Determine which specific partition(s) to be computed is/are allocated to the idle processor according to an evaluation result.

According to loss and profit data of each partition to be computed, a determination is made as to which partition(s) to be computed may be allocated to the idle processor. For example, a partition whose profit is greater than its loss can be allocated to the idle processor.

S206: Determine a mode for migrating the partition data to be computed to the idle processor.

The idle processor may copy data of the partition to be computed from a disk or another processor, and bind it to an idle thread for computation.

S114: Migrate and bind the determined partition to be computed to thread processing of the idle processor.

In implementations, a process of migration is to transfer data of the partition to be computed from one machine to another machine (communication), and rebuild the partition to be computed on a destination machine. The partition to be computed is bound to a thread of the idle processor for processing.

In the method for scheduling a computational operation based on graph data provided by the embodiments of the present disclosure, processors conduct communications with each other, and partitions to be computed are reallocated, which can reduce a waiting time of each processor. Degrees of criticality of the partitions are evaluated before threads execute computations for the partitions, which can reduce an execution time of a certain processor and avoid a relatively long execution time. Evaluating and selecting multiple partitions to be computed can accelerate the convergence and ensure the correctness and termination of data computation operations.

Figure 3:
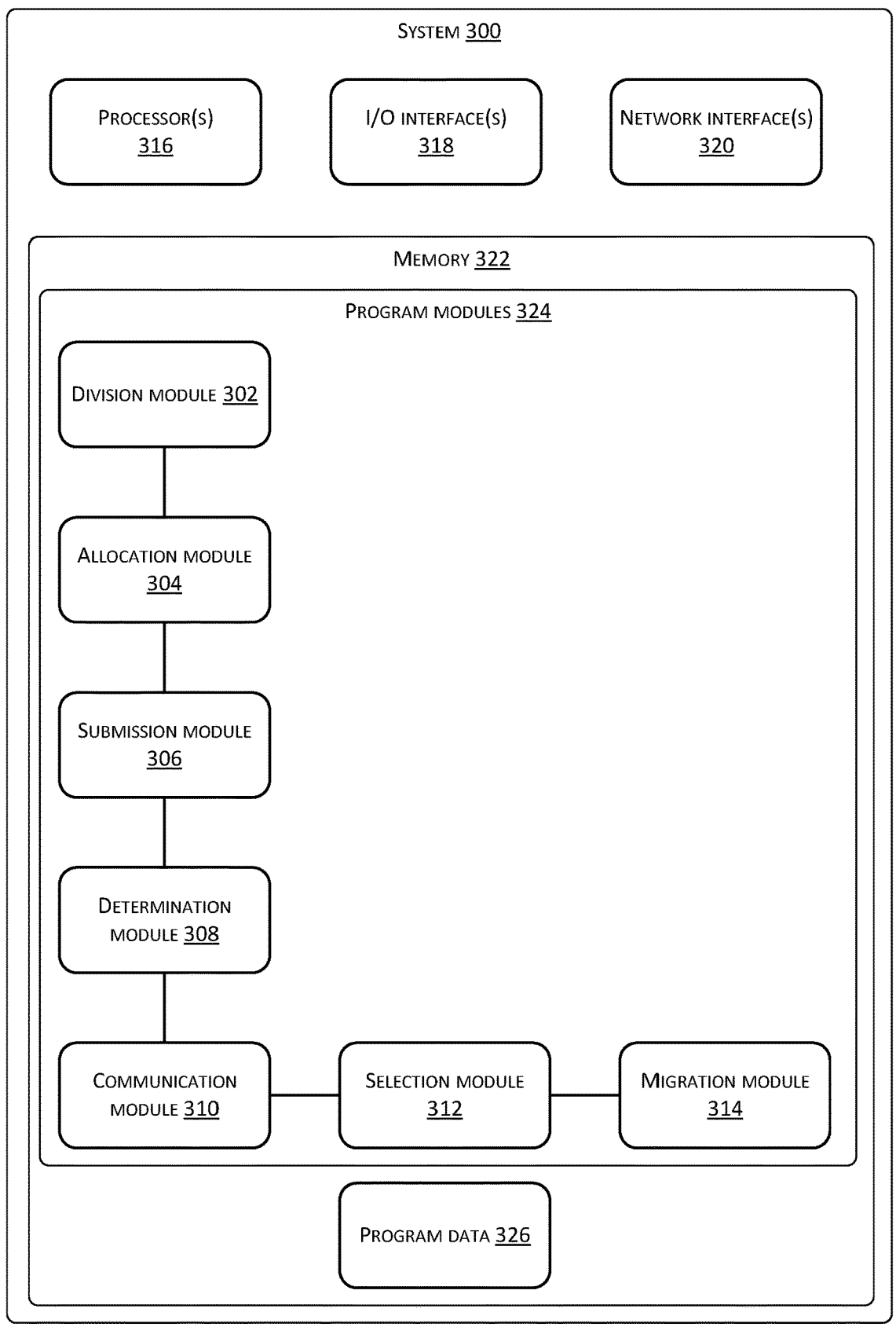
FIG. 3 is a schematic structural diagram of a system for scheduling a computational operation based on graph data according to the embodiment of the present disclosure.

As shown in FIG. 3, the embodiments of the present disclosure provide a system 300 for scheduling a computational operation based on graph data, which includes the following modules.

A division module 302 is configured to divide graph data into multiple partitions.

Methods of partitioning the graph data are not limited, as long as the number of partitions is far greater than the number of threads, so that a scenario of scheduling partitions by threads can be realized. A large number of the partitions can reduce a size of each partition, thereby avoiding a situation where amounts of computations of some partitions are much larger than those of other partitions. In implementations, partitioning can be implemented by a partitioning algorithm, for example, METIS. The partitioning algorithm can follow principles such as ensuring the least number of cross-partition edges and the least number of cross-partition points, etc.

In the present embodiment, in combination with a NUMA (non-uniform memory access architecture) processing system, graph data is divided into three levels. Specifically, the processing system includes at least one computing device, each computing device corresponding to multiple memories, and each memory corresponding to multiple processors. A specific method for three-level partitioning includes:

partitioning graph data according to the number of the computing devices and a communication overhead between the computing devices to obtain multiple first-level partitions;

dividing each first-level partition into multiple second-level partitions according to the number of NUMA nodes in each computing device and a communication overhead between the NUMA nodes; and dividing each second-level partition into multiple third-level partitions according to the number of working nodes in each NUMA node and a communication overhead between each working node, wherein a working node includes a processor or a processor thread.

Data in each third-level partition that is formed is data having a higher degree of correlation. Data in two adjacent third-level partitions has shared edge data. Once a partition updates edge data, a neighboring partition needs to be notified through a message to perform an update.

An allocation module 304 is configured to schedule the partitions to be allocated to multiple processors. After the partitioning module 302 completes partitioning, each processor may be scheduled and allocated with different numbers of partitions because data sizes of each partition are different. Each processor may correspond to multiple threads, and the number of partitions allocated to each processor may be greater than the number of threads corresponding to each processor. The allocation module 304 can adopt an existing scheduling algorithm for execution. A scheduler controls the processors to call different partitions.

A submission module 306 is configured to successively assign the partitions to corresponding threads of the processors for computation according to a respective degree of criticality of each partition. Each thread retrieves partition data from an associated processor to perform computations, and after an execution is completed, can continue to retrieve a next partition from the processor for execution. At this time, it is necessary to evaluate a degree of criticality of each partition, determine a key partition and call for execution, to allow the thread to compute the key partition first, which can reduce an execution time of the partition.

The key partition is evaluated based on data runtime parameters and statistical information thereof. For example, a first partition and a second partition are both associated with data of a third partition. At this time, a determination can be made that the third partition is a key partition, and a thread may perform computations for the third partition first.

A determination module 308 is configured to determine whether an idle processor exists, a processor being an idle processor when the processor includes one or more idle threads.

A communication module 310 is configured to cause the idle processor to communicate with other processor(s), and find partition(s) to be computed and corresponding to the other processor(s). When an idle processor exists, the idle processor may send a message indicating that an idle thread exists to any other processor. When another processor receives the message, if the other processor has a partition to be computed, the other processor may allocate the partition to be computed to the idle processor for computation.

A selection module 312 is configured to select and determine a partition to be computed. When the number of partitions to be computed is multiple, the selection module 26 needs to specifically evaluate how many partitions need to be allocated and which partition(s) is/are migrated to the idle processor. The selection module specifically includes:

Consider an execution time of each partition to be computed and migration overhead(s) associated with the partition(s) to be computed, evaluate losses and profits, and obtain an evaluation result. Data sizes of partitions to be computed are different, and the times required to perform computations are also different. At this time, execution times of partitions under a processor need to be considered as a whole to prevent partitions with a long execution time from being allocated to a same processor. In addition to considering the execution times of the partitions, it is also necessary to consider migration overheads associated with the partitions to be computed. A migration overhead includes a migration overhead formed by time overheads of two parts: transferring data of a partition to be computed from one machine to another (a communication overhead) and rebuilding the partition to be computed on a destination machine.

The evaluation result includes loss and profit data of each partition to be computed. In an evaluation process, an evaluation algorithm can be used for computation, such as a greedy algorithm.

A determination is made as to which specific partition(s) to be computed is/are allocated to the idle processor according to an evaluation result. Specifically, according to loss and profit data of each partition to be computed, a determination is made as to which partition(s) to be computed may be allocated to the idle processor. For example, a partition whose profit is greater than its loss can be allocated to the idle processor.

A mode for migrating the partition data to be computed to the idle processor is determined. In implementations, the idle processor may copy data of the partition to be computed from a disk or another processor.

A migration module 314 is configured to migrate and bind the determined partition to be computed to thread processing of the idle processor. Specifically, a process of migration is to transfer data of the partition to be computed from one machine to another machine (communication), and rebuild the partition to be computed on a destination machine. The partition to be computed is bound to a thread of the idle processor for processing.

In implementations, the system 300 may further include one or more processors 316, one or more input/output (I/O) interfaces 318, one or more network interfaces 320, and memory 322.

The memory 322 may include a form of computer readable media such as a volatile memory, a random access memory (RAM) and/or a non-volatile memory, for example, a read-only memory (ROM) or a flash RAM. The memory 322 is example of a computer readable media. In implementations, the memory 322 may include program modules 324 and program data 326. The program modules 414 may include one or more modules as described in the foregoing description and FIG. 3.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In the system for scheduling a computational operation based on graph data provided by the embodiments of the present disclosure, processors conduct communications with each other, and partitions to be computed are reallocated, which can reduce a waiting time of each processor. Degrees of criticality of the partitions are evaluated before threads execute computations for the partitions, which can reduce an execution time of a certain processor and avoid a relatively long execution time. Evaluating and selecting multiple partitions to be computed can accelerate the convergence and ensure the correctness and termination of data computation operations.

The embodiments of the present disclosure provide a computer readable medium storing a computer program for running graph data, the computer program including instructions for causing a computer system to perform the following operations:
dividing graph data into multiple partitions;
scheduling the partitions to be allocated to multiple processors;
successively assigning the partitions to corresponding threads of the processors for computation according to a respective degree of criticality of each partition;
determining whether an idle processor exists, a processor being the idle processor when the processor includes one or more idle threads;
communicating the idle processor with other processor(s) to find partition(s) to be computed and corresponding to the other processor(s);
selecting and determining a partition to be computed; and
migrating and binding the determined partition to be computed to thread(s) of the idle processor for processing.

The number of partitions allocated to each processor is greater than the number of threads corresponding to each processor.

If multiple partitions to be computed exist, a method of selecting and determining the partition to be computed includes:
considering an execution time of each partition to be computed and migration overheads associated with the partitions to be computed, and evaluating losses and profits;
determining which specific partition to be computed is allocated to the idle processor according to an evaluation result; and
determining a mode for migrating data of the partition to be computed to the idle processor.

The computer-readable storage medium may be ROM/RAM, a magnetic disk, an optical disk, etc., and includes a number of instructions to cause a computing device (which may be a personal computer, a server, or a network device, etc.) to execute each embodiment or some parts of the method of the embodiments.

The embodiments of the present disclosure provide a computer-readable medium storing a computer program for running graph data, which conducts communications between processors, and reallocate partitions to be computed, thus enabling a reduction in a waiting time of each processor. Degrees of criticality of the partitions are evaluated before threads execute computations for the partitions, which can reduce an execution time of a certain processor and avoid a relatively long execution time. Evaluating and selecting multiple partitions to be computed can accelerate the convergence and ensure the correctness and termination of data computation operations.

Figure 4:
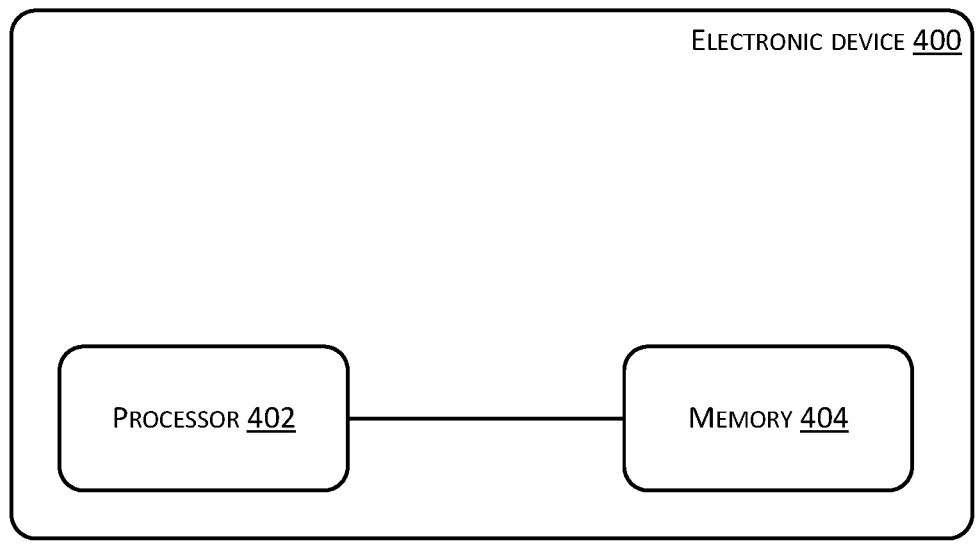
FIG. 4 is a schematic diagram of a structure of an electronic device according to the embodiments of the present disclosure.

As shown in FIG. 4, the embodiments of the present disclosure also provide an electronic device 400, which includes a processor 402 and a memory 404, the memory 404 being configured to store a computer program, and the processor 402 being configured to execute the computer program stored in the memory 404, so that the electronic device 400 executes any of the foregoing methods for scheduling a computational operation based on graph data.

Details of principles of the methods for scheduling a computational operation based on graph data are described in the foregoing embodiments, and are not repeated herein.

The electronic device of the embodiments of the present disclosure exists in various forms, which include but are not limited to:

(1) Mobile communication device: This type of devices is characterized by mobile communication functions, with main goals as providing voice and data communications. This type of terminals includes: a smart phone (such as iPhone), a multimedia phone, a functional phone, and a low-end phone.

(2) Ultra-mobile personal computer device: This type of device belongs to a category of personal computers, having computing and processing functions, and generally having mobile networking features. This type of terminals include: PDA, MID, and UMPC devices, such as iPad.

(3) Portable entertainment device: This type of device is capable of displaying and playing multimedia content. This type of devices include: an audio player, a video player (such as iPod), a handheld game console, an e-book, a smart toy, and a portable car navigation device.

(4) Server, personal computer, and cloud service computing node: A device that provides computing services. A server is composed of a processor, a hard disk, a memory, a system bus, etc. The server is similar to a general computer architecture, and has relatively high requirements in terms of processing power, stability, reliability, security, scalability, and manageability due to the needs of providing highly reliable services.

The electronic device provided by the embodiments of the present disclosure conducts communications between processors, and reallocate partitions to be computed, thus enabling a reduction in a waiting time of each processor. Degrees of criticality of the partitions are evaluated before threads execute computations for the partitions, which can reduce an execution time of a certain processor and avoid a relatively long execution time. Evaluating and selecting multiple partitions to be computed can accelerate the convergence and ensure the correctness and termination of data computation operations.

The apparatus embodiments described above are merely illustrative. The units described as separate components may or may not be physically separated. The components displayed as units may or may not be physical units, i.e., may be located in one place, or may be distributed among multiple network units. Some or all of the modules may be selected according to actual needs to achieve the objectives of the solutions of the embodiments.

Finally, it should be noted that the above embodiments are only used to illustrate the technical solutions of the present disclosure, and do not impose any limitations thereon. Although the present disclosure has been described in detail with reference to the foregoing embodiments, one of ordinary skill in the art should understand that: the technical solutions recorded in the foregoing embodiments can be modified, or some of the technical features thereof can be equivalently replaced. These modifications or replacements do not cause the essences of the corresponding technical solutions to deviate from the spirit and scope of the technical solutions of the embodiments of the present disclosure.

The present disclosure can further be understood using the following clauses.

Clause 1: A method for scheduling a computational operation based on graph data, comprising: dividing graph data into multiple partitions; scheduling the partitions to be allocated to multiple processors; successively assigning the partitions to corresponding threads of the processors for computation according to a respective degree of criticality of each partition; determining whether an idle processor exists, a processor being the idle processor when the processor includes one or more idle threads; communicating the idle processor with other processor(s) to find partition(s) to be computed and corresponding to the other processor(s); selecting and determining a partition to be computed; and migrating and binding the determined partition to be computed to thread(s) of the idle processor for processing.

Clause 2: The method as recited in claim 1, wherein the number of partitions allocated to each processor is greater than the number of threads corresponding to each processor.

Clause 3: The method as recited in claim 1, wherein: if multiple partitions to be computed exist, selecting and determining the partition to be computed comprises: considering an execution time of each partition to be computed and migration overheads associated with the partitions to be computed, and evaluating losses and profits; determining which specific partition to be computed is allocated to the idle processor according to an evaluation result; and determining a mode for migrating data of the partition to be computed to the idle processor.

Clause 4: A system for scheduling a computational operation based on graph data, comprising: a division module configured to divide graph data into multiple partitions; an allocation module configured to schedule the partitions to be allocated to multiple processors; a submission module configured to successively assign the partitions to corresponding threads of the processors for computation according to a respective degree of criticality of each partition; a determination module configured to determine whether an idle processor exists, a processor being the idle processor when the processor includes one or more idle threads; a communication module configured to cause the idle processor to communicate with other processor(s) to find partition(s) to be computed and corresponding to the other processor(s); a selection module configured to select and determine a partition to be computed; and a migration module configured to migrate and bind the determined partition to be computed to thread(s) of the idle processor for processing.

Clause 5: The system as recited in claim 4, wherein the number of partitions allocated to each processor by the allocation module is greater than the number of threads corresponding to each processor.

Clause 6: The system as recited in claim 4, wherein: if multiple partitions to be computed exist, selecting and determining the partition to be computed by the selection module specifically comprises: considering an execution time of each partition to be computed and migration overheads associated with the partitions to be computed, and evaluating losses and profits; determining which specific partition to be computed is allocated to the idle processor according to an evaluation result; and determining a mode for migrating data of the partition to be computed to the idle processor.

Clause 7: A computer readable medium storing a computer program for running graph data, wherein the computer program comprises instructions to cause a computer system to perform the following operations: dividing graph data into multiple partitions; scheduling the partitions to be allocated to multiple processors; successively assigning the partitions to corresponding threads of the processors for computation according to a respective degree of criticality of each partition; determining whether an idle processor exists, a processor being the idle processor when the processor includes one or more idle threads; communicating the idle processor with other processor(s) to find partition(s) to be computed and corresponding to the other processor(s); selecting and determining a partition to be computed; and migrating and binding the determined partition to be computed to thread(s) of the idle processor for processing.

Clause 8: The computer readable medium recited in claim 7, wherein the number of partitions allocated to each processor is greater than the number of threads corresponding to each processor.

Clause 9: The computer readable medium recited in claim 7, wherein: if multiple partitions to be computed exist, a method of selecting and determining the partition to be computed comprises: considering an execution time of each partition to be computed and migration overheads associated with the partitions to be computed, and evaluating losses and profits; determining which specific partition to be computed is allocated to the idle processor according to an evaluation result; and determining a mode for migrating data of the partition to be computed to the idle processor.

Clause 10: An electronic device, comprising: a processor; and a memory, wherein the memory is configured to store a computer program, and the processor is configured to execute the computer program stored in the memory, to cause the electronic device to execute any of the foregoing methods for scheduling a computational operation based on graph data.

What is claimed is:

1. A method implemented by a computing device, the method comprising:
   determining that an idle processor of multiple processors exists, the multiple processors being allocated with multiple partitions of graph data;
   considering an execution time of a respective partition to be computed and a migration overhead of the respective partition to be computed to obtain an evaluation result by evaluating losses and profits, the migration overhead of the respective partition to be computed including a respective time overhead including a first time overhead of transferring data of the respective partition to be computed from a first machine to a second machine and a second time overhead of rebuilding the respective partition on the second machine;
   causing the idle processor to communicate with one or more other processors to determine one or more partitions to be computed, according to respective degrees of criticality of respective partitions and the evaluation result, corresponding to the one or more other processors; and
   migrating and binding the determined one or more partitions to be computed to one or more threads of the idle processor for processing.

2. The method as recited in claim 1, wherein a specific processor is determined to be the idle processor in response to determining that the specific processor includes one or more idle threads.

3. The method as recited in claim 1, further comprising: dividing the graph data into the multiple partitions.

4. The method as recited in claim 3, further comprising: successively assigning the multiple partitions to corresponding threads of the multiple processors for computation according to the respective degrees of criticality of the respective partitions.

5. The method as recited in claim 1, wherein a number of partitions allocated to each processor is greater than a number of threads corresponding to each processor.

6. The method as recited in claim 1, wherein: the one or more partitions to be computed comprise multiple partitions to be computed.

7. The method as recited in claim 1, further comprising: determining a mode for migrating data of the determined one or more partitions to be computed to the idle processor.

8. One or more computer readable media storing executable instructions that, when executed by a computing device, cause the computing device to perform acts comprising:
   determining that an idle processor of multiple processors exists, the multiple processors being allocated with multiple partitions of graph data;
   considering an execution time of a respective partition to be computed and a migration overhead of the respective partition to be computed to obtain an evaluation result by evaluating losses and profits, the migration overhead of the respective partition to be computed including a respective time overhead including a first time overhead of transferring data of the respective partition to be computed from a first machine to a second machine and a second time overhead of rebuilding the respective partition on the second machine;
   causing the idle processor to communicate with one or more other processors to determine one or more partitions to be computed, according to respective degrees of criticality of respective partitions and the evaluation result, corresponding to the one or more other processors; and
   migrating and binding the determined one or more partitions to be computed to one or more threads of the idle processor for processing.

9. The one or more computer readable media as recited in claim 8, wherein a specific processor is determined to be the idle processor in response to determining that the specific processor includes one or more idle threads.

10. The one or more computer readable media as recited in claim 8, the acts further comprising:
    dividing the graph data into the multiple partitions.

11. The one or more computer readable media as recited in claim 10, the acts further comprising:
    successively assigning the multiple partitions to corresponding threads of the multiple processors for computation according to the respective degrees of criticality of the respective partitions.

12. The one or more computer readable media as recited in claim 8, wherein a number of partitions allocated to each processor is greater than a number of threads corresponding to each processor.

13. The one or more computer readable media as recited in claim 8, wherein: the one or more partitions to be computed comprise multiple partitions to be computed.

14. The one or more computer readable media as recited in claim 8, the acts further comprising:
    determining a mode for migrating data of the determined one or more partitions to be computed to the idle processor.

15. A system comprising:
    one or more processors;
    memory;
    a determination module stored in the memory and executable by the one or more processors to determine whether an idle processor of multiple processors exists, the multiple processors being allocated with multiple partitions of graph data;
    a selection module stored in the memory and executable by the one or more processors to consider an execution time of a respective partition to be computed and a migration overhead of the respective partition to be computed, and evaluate losses and profits, the migration overhead of the respective partition to be computed including a respective time overhead including a first time overhead of transferring data of the respective partition to be computed from a first machine to a second machine and a second time overhead of rebuilding the respective partition on the second machine;
    a communication module stored in the memory and executable by the one or more processors to cause the idle processor to communicate with one or more other processors to determine one or more partitions to be computed and corresponding to the one or more other processors based on an evaluation result of the selection module; and
    a migration module stored in the memory and executable by the one or more processors to migrate and bind the determined one or more partitions to be computed to one or more threads of the idle processor for processing.

16. The system recited in claim 15, wherein a specific processor is determined to be the idle processor when the specific processor includes one or more idle threads.

17. The system recited in claim 15, further comprising:
a division module configured to divide the graph data into the multiple partitions;
an allocation module configured to schedule the multiple partitions to the multiple processors; and
a submission module configured to successively assign the multiple partitions to corresponding threads of the multiple processors for computation according to respective degrees of criticality of respective partitions.

18. The system as recited in claim 17, wherein a number of partitions allocated to each processor by the allocation module is greater than a number of threads corresponding to each processor.

19. The system as recited in claim 15, wherein: the determined one or more partitions to be computed comprise multiple partitions to be computed, and the selection module is further configured to:
determine which specific partition to be computed is allocated to the idle processor according to the evaluation result.

20. The system as recited in claim 19, wherein the selection module is further configured to:
determine a mode for migrating data of the determined one or more partitions to be computed to the idle processor.

* * * * *